Patented Aug. 20, 1946

2,406,081

UNITED STATES PATENT OFFICE 2,406,081

POLYMERIZATION OF OLEFIN HYDROCARBONS

William A. La Lande, Jr., and Heinz Heinemann, Upper Darby, Pa., assignors to Porocel Corporation, Philadelphia, Pa., a corporation of Delaware No Drawing. Application November 7, 1944, Serial No. 562,405

9 Claims. (Cl. 260—683.15)

The present invention relates to the polymerization of olefins, and more particularly to the polymerization of normally gaseous olefins to liquid hydrocarbons comprising essentially aliphatic polymers or copolymers suitable for use in the manufacture of motor fuel.

An object of this invention is the polymerization of olefins or of gaseous mixtures containing olefins in the presence of a catalyst comprising activated bauxite to produce polymers boiling for the most part within the gasoline boiling range.

A further object of this invention is the polymerization of dehydrated gaseous olefins, particularly the butylenes, at temperatures below 350 degrees F. in the presence of a catalyst comprising bauxite which has been activated by heating at a temperature between 700 degrees F. and 1800 degrees F., and preferably between 1200 degrees F. and 1800 degrees F. to a residual moisture content of not more than 2% by weight, and preferably 1% or less by weight.

It has been proposed heretofore to crack or polymerize hydrocarbon gases in the presence of various adsorbent catalysts such as fuller's earth, acid activated bentonite, silica gel, activated carbon, alumina, and alumina supported on silica. These materials, with the exception of alumina, possess in varying degrees the ability to catalyze the polymerization of olefins, the catalytic efficiency and catalyst life differing as between the materials. Alumina, however, was found to have little or no activity in olefin polymerization, even when employed under the most favorable conditions.

We have found that bauxite, when activated under certain conditions, is superior to the catalysts above mentioned, particularly with respect to rate of decrease in efficiency, and total useful life. More specifically, we have found that bauxite, when heated to a temperature between 700 degrees F. and 1800 degrees F. for sufficient time to reduce its moisture content or "volatile matter" to 6% by weight or less, exhibits to a marked degree, the ability to catalyze the polymerization or copolymerization of olefins to liquid hydrocarbons. Even better results are obtained in the polymerization or copolymerization, using bauxite which has been activated at 1200 degrees F. to 1800 degrees F. to a residual moisture content of not more than 2% by weight, and preferably 1% or less by weight. In order to obtain the most efficient polymerization, the olefins undergoing conversion should be substantially free of moisture, and this may be accomplished by dehydrating the olefins in a conventional manner with drying agents such as Activated Alumina, silica gel, calcium chloride and the like. While our process is particularly applicable to the polymerization of the butylenes, especially isobutylene, such process may also be utilized in the conversion of gaseous mixtures including other olefins such as propylene, or mixtures of gases including ethane, ethylene, propane, propylene, the butanes, and the butylenes. However, the presence of substantial quantities of gaseous hydrocarbons other than the butylenes appears to have an adverse effect upon the catalyst, and the conversion efficiency of the catalyst is substantially decreased from that attainable with the butylenes or isobutylene, per se. When the gaseous mixture comprises the butylenes, or the butylenes with various proportions of other gaseous hydrocarbons, it is preferred to carry out the polymerization under substantial superatmospheric pressure, for example, from 100 to 2,000 pounds per square inch. However, in the polymerization of isobutylene or copolymerization of isobutylene with butene-1 or butene-2, the operation may be carried out at substantially atmospheric pressure, or higher pressures, if desired.

In carrying out our process we bring the gaseous olefin or mixture containing gaseous olefins into contact with the thermally activated bauxite at temperatures not in excess of 350 degrees F. for a period of time sufficient to effect polymerization with the production of liquid hydrocarbons comprising for the most part aliphatic polymers boiling within the motor fuel range or having an assay distillation end point not substantially above 400 degrees F. The polymerization of isobutylene in the presence of bauxite of low moisture content is initiated at ordinary temperature (70 degrees F. or lower) and since the reaction is exothermic, it may be necessary to provide cooling of the catalyst to prevent the reaction temperature from reaching depolymerization or decomposition levels. Ordinarily, a high degree of conversion may be obtained with catalyst temperatures of from 100 degrees F. to 300 degrees F., precaution being taken to avoid temperatures much in excess of 350 degrees F. The bauxite may be employed in the form of granular particles or pellets of desired size, or may be utilized in finely divided condition wherein it is suspended or dispersed in the olefins during the conversion reaction and is removed from the reaction product upon completion of the reaction. It is preferred, however, to utilize the bauxite in the form of granules disposed as a bed through which the olefins may be passed in order to effect polymerization, which bed may be heated or cooled as required to maintain it at the desired conversion temperature. When, after prolonged use, the polymerizing efficiency of the bauxite has decreased to a commercially uneconomical level, the bauxite may be regenerated by various methods, the most simple and inexpensive of which is heating in the presence of air. In lieu of thermal regeneration per se, the spent bauxite may be treated with steam or solvents and thereafter subjected to heating at temperatures up to 1800 degrees F. The regeneration usually accomplishes complete reactivation of the bauxite to 100% of its original efficiency.

In carrying out the polymerization, the space velocity (volume of gas per volume of catalyst per hour) employed is not particularly important, since within certain limits a high degree of conversion is obtained regardless of the space velocity. In the polymerization of isobutylene, for example, at 300 degrees F. in the presence of bauxite catalyst, 100% conversion of the isobutylene to liquid hydrocarbons is obtained with space velocities up to 375 volumes of gaseous isobutylene per volume of bauxite per hour. With increase in space velocity from 375 to 440, the conversion decreases progressively from 100% to 90%, and with even higher space velocities, the percentage conversion decreases further.

Our invention may be further illustrated by the following examples, which, however, are not to be construed as limiting the scope thereof.

1. Isobutylene of 95% purity was passed at a space velocity of 250 vols. per vol. of catalyst per hour through a bed of 200 grams of 6–14 mesh bauxite which had been activated by heating at 1200 degrees F. to a moisture content of 1.18% by weight. The polymerization reaction temperature was maintained at 275 degrees F. and total condensation to liquid hydrocarbon products was obtained, with no decline in catalyst activity during the run which produced 6 grams of liquid products per gram of catalyst. Distillation of the unstabilized product yielded 67% by volume of hydrocarbons boiling between 72 degrees F. and 375 degrees F., 70% of which distillate boiled between 200 degrees F. and 250 degrees F. and comprised mainly diisobutylene and minor amounts of tri-isobutylene.

2. A mixture of isobutylene and butene-1, in a volume ratio of one to one, was passed at a space velocity of 250 vols. per vol. of catalyst per hour through a bed of 200 grams of 6–14 mesh bauxite which had been activated by heating at 1200 degrees F. to a moisture content of 1.18% by weight. The polymerization reaction temperature was maintained at 350 degrees F., the run producing 55 grams of liquid products comprising isobutylene polymers and isobutylene-butene-1 copolymers, as contrasted with 49 grams of polymers when isobutylene alone was polymerized under the same conditions.

3. Isobutylene was passed at a rate of 43 liters per hour through 200 gram beds of bauxite which had been activated by heating at various temperatures, the polymerization reactions being carried out at various temperatures to obtain liquid hydrocarbon products. The length of time of each run was two hours, and the results obtained are shown in the following table, the yields being expressed in weight percent of the isobutylene charged.

| Reaction temp., degrees F. | Percent conversion; bauxite activated at— | | | | |
| --- | --- | --- | --- | --- | --- |
| | 600° F. 8.5% V. M. | 700° F. 6.0% V. M. | 1200° F. 1.3% V. M. | 1400° F. 0.8% V. M. | 1800° F. 0.3% V. M. |
| 100–140 | | | | | |
| 200 | 0.0 | 35 | 91 | 100 | 98 |
| 250 | | | 96 | 100 | 95 |
| 350 | 0.0 | 60 | 100 | | 93 |
| 450 | | 45 | 91 | | |
| 600 | | | 50 | | |
| 800 | | | 34 | | |
| | | | 22 | | |

The % V. M. comprehends volatile matter or moisture in the bauxite.

4. Isobutylene was passed at a rate of 43 liters per hour through a 200 gram bed of bauxite activated by heating at a temperature of 1200 degrees F. The conversion temperature was maintained at 300 degrees F., and 100% conversion of the isobutylene to liquid products was obtained for a period of 300 minutes, at which time the run was stopped, the efficiency still being 100%. The stabilized product contained 93% by volume of hydrocarbons boiling below 400 degrees F., and this product when hydrogenated at atmospheric pressure in the presence of a catalyst consisting of nickel supported on kieselguhr at a temperature of 450 degrees F., had an octane number (motor method) of 104, and with 2 cc. of tetraethyl lead added, had an octane number of 109.

Characteristic boiling data of the stabilized product produced according to the present invention are shown in the following table. While most of the product is suitable for hydrogenation to an aviation gasoline blending stock, the small high boiling end may be depolymerized over bauxite, fuller's earth, or the like at elevated temperatures above about 800 degrees F. and recycled to the polymerization operation.

| | |
| --- | --- |
| Initial boiling point °F | 180 |
| 10% | 213 |
| 30% | 221 |
| 50% | 226 |
| 70% | 233 |
| 80% | 241 |
| 90% | 288 |
| End point | 370 |
| Per cent dist | 97 |
| Per cent res | 2 |
| Spec. gravity | 0.7335 |

We claim:

1. The method of polymerizing normally gaseous olefins to liquid hydrocarbons, which comprises contacting said olefins at a polymerizing temperature below 350 degrees F. with bauxite which has been activated by heating at a temperature between 700 degrees F. and 1800 degrees F. to a residual moisture content of not more than 6% by weight.

2. The method of polymerizing normally gaseous olefins to liquid hydrocarbons, which comprises contacting said olefins at a polymerizing temperature below 350 degrees F. with bauxite which has been activated by heating at a temperature between 1200 degrees F. and 1800 degrees F. to a residual moisture content of not more than 2% by weight.

3. The method of polymerizing a normally gaseous olefin mixture consisting essentially of butylenes to liquid hydrocarbons, which comprises contacting said olefin mixture at a polymerizing temperature below 350 degrees F. with bauxite which has been activated by heating at a temperature between 700 degrees F. and 1800 degrees F. to a residual moisture content of not more than 6% by weight.

4. The method of polymerizing a normally gaseous olefin mixture consisting essentially of butylenes to liquid hydrocarbons, which comprises contacting said olefin mixture at a polymerizing temperature below 350 degrees F. with bauxite which has been activated by heating at a temperature between 1200 degrees F. and 1800 degrees F. to a residual moisture content of not more than 2% by weight.

5. The method of polymerizing isobutylene to liquid hydrocarbons, which comprises contacting said isobutylene at a polymerizing temperature below 350 degrees F. with bauxite which has been activated by heating at a temperature between 700 degrees F. and 1800 degrees F. to a residual moisture content of not more than 6% by weight.

6. The method of polymerizing isobutylene to liquid hydrocarbons, which comprises contacting said isobutylene at a polymerizing temperature below 350 degrees F. with bauxite which has been activated by heating at a temperature between 1200 degrees F. and 1800 degrees F. to a residual moisture content of not more than 2% by weight.

7. The method of polymerizing isobutylene to liquid hydrocarbons, which comprises contacting said isobutylene at a polymerizing temperature below 350 degrees F. with bauxite which has been activated by heating at a temperature of about 1200 degrees F. to a residual moisture content of not more than 1% by weight.

8. The method of copolymerizing a mixture of isobutylene and normal butylene to liquid hydrocarbons, which comprises contacting said mixture of isobutylene and normal butylene at a polymerizing temperature below 350 degrees F. with bauxite which has been activated by heating at a temperature between 700 degrees F. and 1800 degrees F. to a residual moisture content of not more than 6% by weight.

9. The method of copolymerizing a mixture of isobutylene and normal butylene to liquid hydrocarbons, which comprises contacting said mixture of isobutylene and normal butylene at a polymerizing temperature below 350 degrees F. with bauxite which has been activated by heating at a temperature between 1200 degrees F. and 1800 degrees F. to a residual moisture content of not more than 2% by weight.

WILLIAM A. LA LANDE, Jr.
HEINZ HEINEMANN.